United States Patent [19]
Francis

[11] Patent Number: 5,669,363
[45] Date of Patent: Sep. 23, 1997

[54] TURBOCHARGER INTERCOOLER CONTROL MEANS

[75] Inventor: John Peter Francis, Edmunds, Great Britain

[73] Assignee: Amot Controls Limited, Suffolk, Great Britain

[21] Appl. No.: 626,548

[22] Filed: Apr. 2, 1996

[51] Int. Cl.[6] .................................................. F02B 29/04
[52] U.S. Cl. ............................................ 123/563; 236/34.5
[58] Field of Search ................................ 60/599; 123/563; 236/34, 34.5, 100

[56] References Cited

U.S. PATENT DOCUMENTS

| | | | |
|---|---|---|---|
| 1,371,444 | 3/1921 | Sherbondy | 123/563 |
| 3,712,282 | 1/1973 | Isley | 123/563 |

FOREIGN PATENT DOCUMENTS

| | | |
|---|---|---|
| 1 938 097 | 2/1971 | Germany . |
| 2 033 307 | 1/1972 | Germany . |
| 39 29 123 | 3/1990 | Germany . |
| 1 255 956 | 12/1971 | United Kingdom . |
| 2 223 272 | 4/1990 | United Kingdom . |

*Primary Examiner*—Michael Koczo
*Attorney, Agent, or Firm*—Gary M. Nath; Nath & Associates

[57] ABSTRACT

Valve means to control the flow of charge air through a turbocharger intercooler by-pass, comprising a valve housing defining a passage having an inlet and an outlet and adapted to form at least part of the said by-pass, a valve member movably mounted on the housing to close the passage, resilient means on the housing and urging the valve member into a position wherein the passage is open, actuating means for moving the valve member between open and closed positions and thermostatic means mounted on the valve housing and extending beyond said passage for sensing charge air temperature, said thermostatic means being operatively coupled to the valve actuating means to cause the valve member to close the valve when the sensed temperature reaches a given value.

9 Claims, 3 Drawing Sheets

TURBOCHARGER INTERCOOLER CONTROL MEANS

DESCRIPTION

The invention relates to turbocharger control means and more particularly, but not exclusively, to means for the control of turbochargers for internal combustion engines such as reciprocating piston diesel engines.

It is known to control the temperature of charge air entering a reciprocating piston diesel engine from an exhaust gas turbocharger, by passing the charge air first through an intercooler or radiator and to provide a by-pass which avoids the intercooler or radiator to prevent overcooling of the charge air in certain operating conditions, e.g. on start-up and at low ambient temperatures. It is known for the by-pass to be controlled by means of a valve, e.g. a flap valve, under the operation of an actuator which is in turn controlled by a temperature sensor disposed in the engine inlet. This arrangement is costly and not easily adaptable to the needs of smaller engines, e.g. in commercial trucks.

It is an object of the invention to provide valve means for controlling the intercooler radiator by-pass from an exhaust gas turbocharger to an engine inlet, which is simple and therefore inexpensive compared to the known control means.

According to the invention, there is provided valve means for controlling an intercooler radiator by-pass comprising a valve for controlling flow of charge air through the by-pass and thermostatic means capable of sensing the charge air temperature at or near the engine inlet and causing the valve to open when the charge air temperature is low, the valve means being arranged for disposition wholly within the by-pass.

The valve means may be generally of the kind used for controlling the liquid coolant temperature of an internal combustion engine, i.e. a thermostatic valve. In the present case however it is preferred that the thermostatic valve works in the reverse sense to that normally found in an engine cooling system so that, should the valve fail, it fails safe, that is to say with the valve open.

In a preferred embodiment the invention provides valve means to control the flow of charge air through a turbocharger intercooler by-pass, the valve means having a valve in the by-pass, actuating means for the valve, and means for sensing the charge air temperature, the sensing means being operatively coupled to the valve actuating means, characterised by a valve having a body by which the valve can be mounted in the by-pass, a valve member movably mounted on the body to close the by-pass, resilient means on the body and urging the valve member into a position wherein the by-pass is open, and thermostatic means on the valve body for the sensing charge air temperature and for actuating the valve member to close the valve when the sensed temperature reaches a given value. Preferably the temperature sensing means and valve actuating means comprises a wax-filled bulb.

The valve member may be tubular or disc-like and may be arranged for axial movement on the valve body.

The valve means preferably comprises a valve housing forming one end of the by-pass and in which the valve is mounted, the housing being formed with means, e.g. a shoulder or end face, against which the valve member can abut to close the by-pass. Preferably the housing forms the down-stream end of the by-pass whereby the temperature sensing means of the valve is positioned adjacent the engine inlet.

From another aspect the invention is the combination of an internal combustion engine, an exhaust gas turbocharger, an intercooler through which charge gas from the turbocharger is passed to the engine, a by-pass for the intercooler, and valve means for controlling the by-pass, characterised in that the valve means comprises a valve having a body by which the valve can be mounted in the by-pass, a valve member movably mounted on the body to close the by-pass resilient means on the body and urging the valve member into a position in which the by-pass is open, and thermostatic means on the valve body for sensing the charge air temperature and for actuating the valve member to close the valve when the sensed temperature reaches a given value.

From yet another aspect the invention is an engine propelled vehicle comprising either the valve means or the combination set-out above.

The invention is diagrammatically illustrated by way of example in the accompanying drawings in which.

Figure 1:
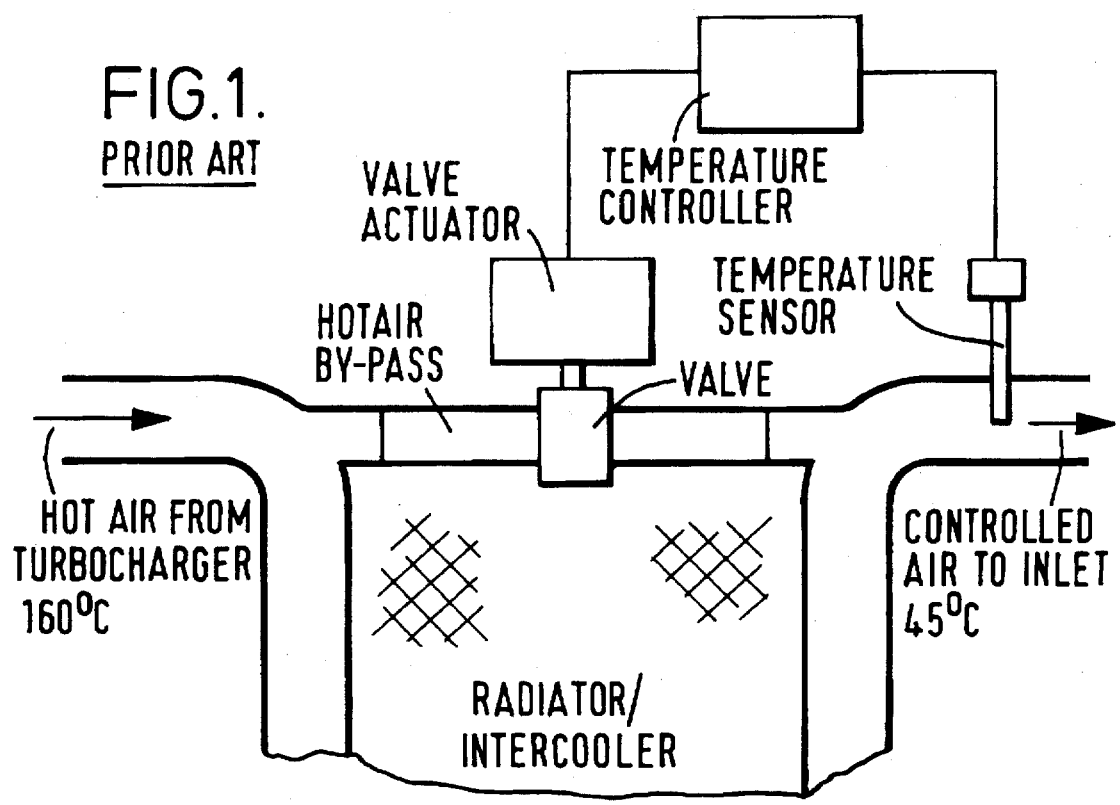
FIG. 1 illustrates a conventional (prior art) system for controlling a radiator intercooler by-pass from an exhaust gas turbocharger to an engine inlet.

In the drawings there is shown means for controlling the temperature of the charge air entering an internal combustion engine, e.g. a reciprocating piston diesel engine, from an exhaust gas turbocharger. FIG. 1 illustrates a known device in which a hot gas by-pass is provided which short-circuits a radiator or intercooler provided in the flow path from the turbocharger to the engine air inlet to cool the charge air. The by-pass enables high temperature charge air to pass directly to the engine inlet to avoid over cooling of the charge air as, for example, might occur on engine start-up in cold conditions. The hot charge air by-pass is under the control of a valve e.g. a flap valve, disposed in the by-pass and which is operated by an external actuator which is in turn controlled by an external temperature controller which is acted on by a temperature sensor-provided in the engine air inlet. Such a mechanism can accurately control the charge air temperature but is expensive to produce. In addition the mechanism is largely external, which can cause difficulty in some automotive applications where space is limited.

Figure 2:
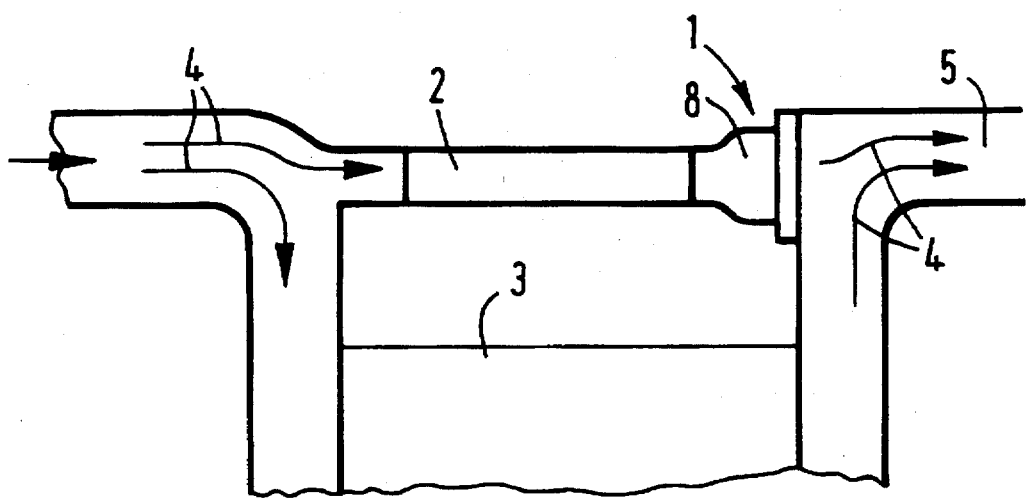
FIG. 2 is a diagram generally similar to that of FIG. 1 and showing a control arrangement in accordance with the present invention.

In FIG. 2 there is shown value means 1 for controlling the temperature of the charge air entering an internal combustion engine (not shown), e.g. a reciprocating piston diesel engine, from an exhaust gas turbocharger (not shown) in an arrangement in which a by-pass 2 is provided which short circuits a radiator or intercooler 3 provided in the flow path indicated by arrows 4 from the turbocharger to the engine air inlet 5 to cool the charge air. The by-pass 2, which is under the control of valve means 1, enables high temperature charge air to pass directly to the engine inlet 5 to avoid over cooling of the charge air as, for example, might occur on engine start-up in cold conditions.

The arrangement shown in FIG. 2 is thus generally similar to that shown in FIG. 1 but the valve mechanism including the external actuator and temperature controller for controlling the hot charge air by-pass 2 is replaced by a valve means disposed wholly within or forming part of the by-pass 2 and/or inlet 5 and arranged to sense the charge air temperature in the engine inlet.

Figure 3:
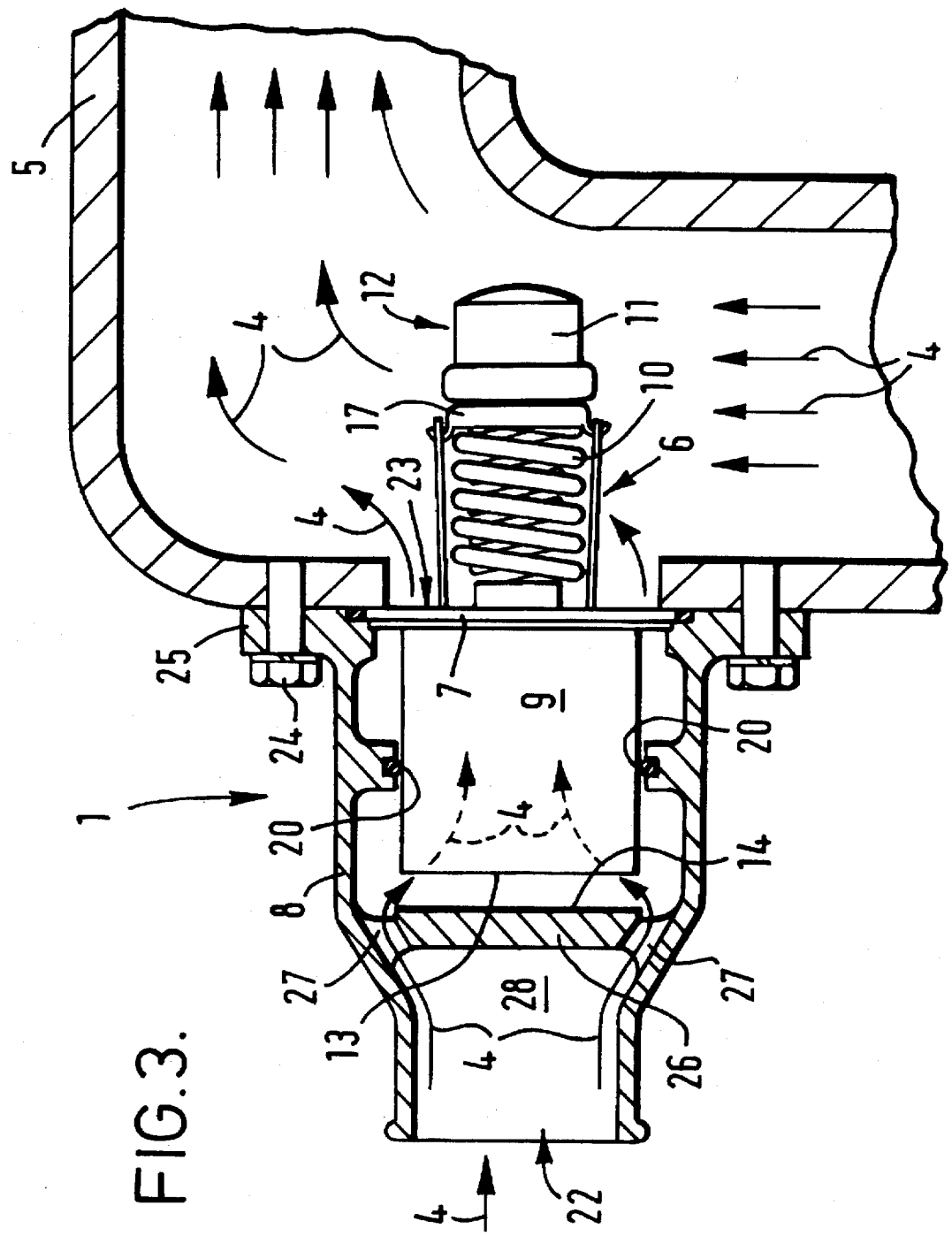
FIG. 3 is a sectioned cut-away view of part of valve means for the control arrangement of FIG. 2.

As shown in FIG. 3 of the drawings, the valve means 1 of the embodiment of FIG. 2 comprises a generally tubular hollow housing 8 defining a through passage 28 having an inlet 22 and an outlet 23. The passage is intended to form part of the by-pass 2 and communicates with the by-pass at its inlet end 22 and with the engine inlet 5 at its outlet end 23. The housing 8 is formed with lugs 25 at its outlet end 23 by which the housing can be fixed to the engine inlet by means of screw fasteners 24. The housing 8 carries a thermostatic valve 6 comprising a disc-like mounting member 7 by which the valve 6 is held in position in the housing 8 by being sandwiched between the housing 8 and the inlet 5 and which carries a valve body 17 which supports a movable tubular valve member 9 which is constantly biased into an open position as shown in FIG. 3 by resilient means in the form of a coil spring 10 and which is drawn into a closed position (not shown) by actuating means 11 which comprises a bulb of wax, in known manner. The wax bulb forms the temperature sensing portion 12 of the thermostatic valve and is arranged to extend away from the passage 28 into the engine charge air inlet 5 to sense the temperature of the inlet air.

The thermostatic valve of the present invention is somewhat similar to thermostatic valves known and used for many years to control engine coolant systems at start-up to reduce the time taken to achieve operating temperature, but is distinguished from the known valves used in engine coolant systems in that the valve is arranged to fail-safe, that is, with the valve member opening the by-pass as shown in FIG. 3 to prevent over cooling of the engine.

The valve member 9 is an open-ended hollow tubular body which is axially slidably mounted in the housing 8 with a seal 20 in the housing making sliding sealing contact with the external peripheral face of the valve member 9 whereby charge air passing through the valve means is constrained to pass through the tubular valve member 9 as indicated by arrows 4. The housing 8 is formed with a plate-like member 26 extending across the passage 28 and having a face 14. Apertures 27 in the member 26 connect the inlet and outlet ends of the passage 28.

In operation, the valve member 9 closes to shut-off the by-pass 2 to prevent air from by-passing the intercooler when the temperature sensor 12 senses a sufficiently high temperature in the inlet 5. The valve member 9 closes the by-pass by movement to the left as viewed in FIG. 3 so that the axial end 13 of the tubular valve member 9 abuts against the end 14 of the plate-like member 26 to prevent air flow through the valve member 9 and thus through the by-pass 2.

Figure 4:
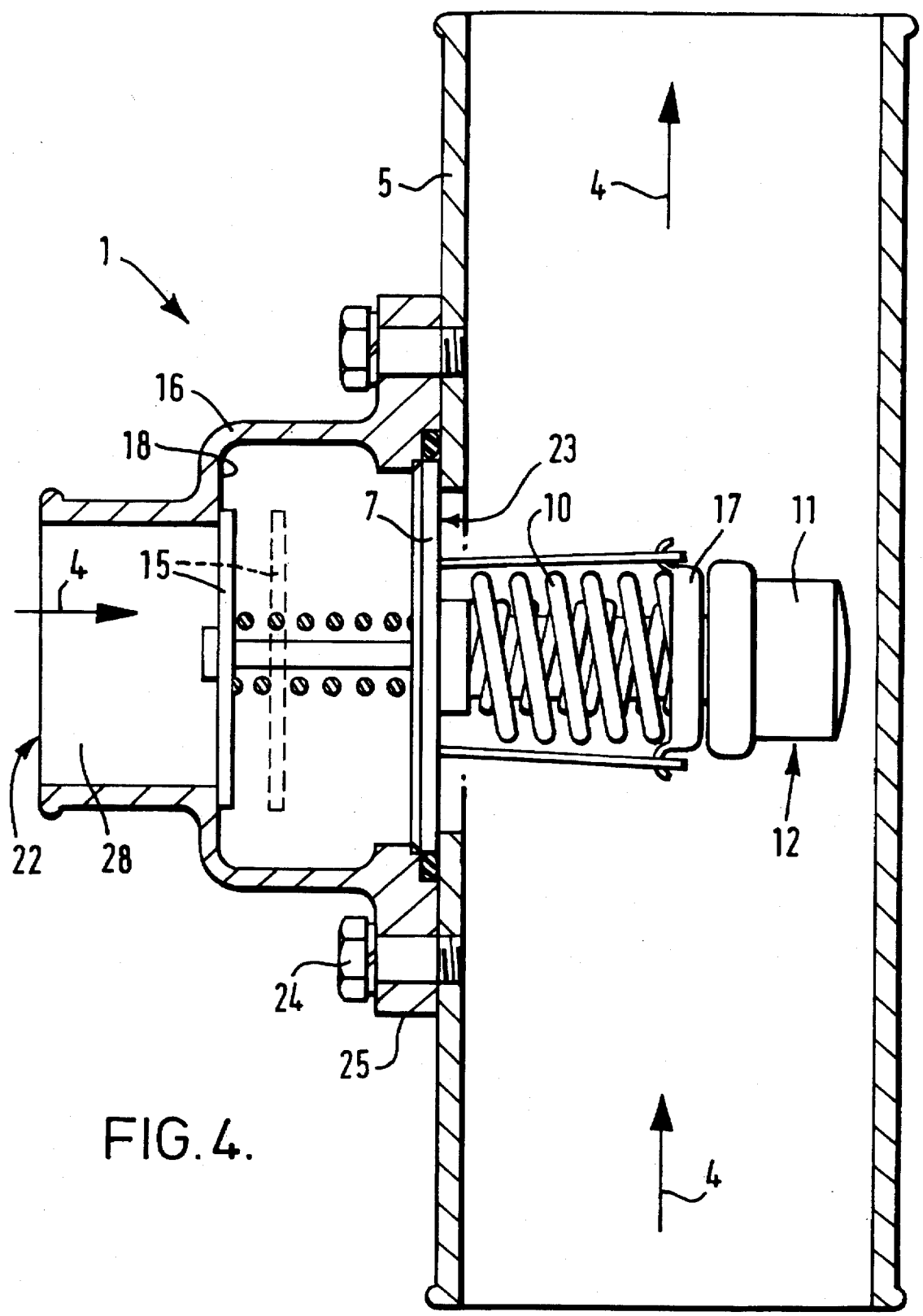
FIG. 4 is a sectioned cut-away view generally similar to that of FIG. 3 and showing valve means particularly adapted for retro-fitting to existing engines.

The arrangement shown in FIG. 4 is generally similar to that described above with reference to FIGS. 2 and 3 but is intended for retro-fitting to existing engine/turbocharger/intercooler-radiator systems. The form of valve shown in FIG. 4, in which the valve member 15 is disc-like, may be preferable in some instances to the arrangement shown in FIG. 3 in which the valve member 9 is tubular, since it may enable the use of a relatively simple valve housing 16 compared to the relatively complex valve-housing 8 as shown in FIG. 3. In FIG. 4 the valve member 15 is shown in dotted lines in its open position and is shown in full lines in the closed position, in which the disc 15 abuts against a shoulder 18 of the housing to close the by-pass 2.

The invention thus provides a simple but effective mechanism for controlling a hot air by-pass of the kind described which is arranged to be disposed entirely internally of the by-pass and which is much less complicated than the known arrangement of FIG. 1.

I claim:

1. Valve means to control the flow of charge air through a turbocharger intercooler by-pass, comprising a valve housing defining a valve passage having an inlet and an outlet and arranged wholly within said by-pass, a valve member movably mounted on the housing to close the by-pass, resilient means on the housing and urging the valve member into a position wherein the by-pass is open, actuating means for moving the valve member between open and closed positions and thermostatic means mounted on the valve housing and extending beyond said valve passage for sensing charge air temperature, said thermostatic means being operatively coupled to the valve actuating means to cause the valve member to close bypass when the sensed temperature reaches a given value.

2. Valve means according to claim 1, wherein the temperature sensing means and valve actuating means comprise a wax-filled bulb.

3. Valve means according to claim 1, wherein the valve member is tubular and is arranged for axial movement in the valve housing.

4. Valve means according to claim 1, comprising abutment means in the housing and against which the valve member can abut to close the passage.

5. Valve means according to claim 3, wherein the tubular valve member has an external peripheral surface slidable in the valve housing, and comprising a seal slidably sealing the external peripheral surface of the valve member against the housing.

6. Valve means according to claim 5, wherein the passage in the housing is adapted to form the down-stream end of the by-pass and comprising means on the housing for securing the housing to the charge air inlet of an internal combustion engine whereby the said valve passage communicates with the inlet.

7. Valve means according to claim 4, wherein the tubular valve member has an external peripheral surface slidable in the valve housing, and comprising a seal slidably sealing the external peripheral surface of the valve member against the housing.

8. An intercooler for an internal combustion engine exhaust gas turbocharger comprising a charge air by-pass for the intercooler, and valve means for controlling the by-pass, wherein the valve means comprises a valve housing defining a valve passage having an inlet and an outlet and arranged wholly within said by-pass, a valve member movably mounted on the housing to close the by-pass, resilient means on the housing and urging the valve member into a position wherein the by-pass is open, actuating means for moving the valve member between open and closed positions and thermostatic means mounted on the valve housing and extending beyond said valve passage for sensing charge air temperature exiting the intercooler, said thermostatic means being operatively coupled to the valve actuating means to cause the valve member to close the by-pass when the sensed temperature reaches a given value.

9. An engine assembly comprising:
   internal combustion engine;
   an exhaust gas turbocharger means for supplying charge air to an engine inlet;
   an intercooler fan for cooling the charge air supplied to the engine inlet by the turbocharger;
   a charge air passage connecting the intercooler to the engine inlet;
   an intercooler by-pass connecting the turbocharger and the said charge-air passage; and valve means for controlling the by-pass, wherein the valve means includes a valve housing defining a valve passage having an inlet and an outlet and arranged wholly within said by-pass, a valve member movably mounted on the housing to close the valve passage, resilient means on the housing and urging the valve member into a position wherein the valve passage is open, actuating means for moving the valve member between open and closed positions and thermostatic means mounted on the valve housing and extending into the said charge air passage for sensing charge air temperature in the engine inlet, said thermostatic means being operatively coupled to the valve actuating means to cause the valve member to close the by-pass when the sensed temperature reaches a given value.

* * * * *